United States Patent [19]
Ohtsuki et al.

[11] Patent Number: 4,931,622
[45] Date of Patent: Jun. 5, 1990

[54] ELECTRONIC CARD RECEIVING DEVICE AND EJECTION MECHANISM

[75] Inventors: Tomonari Ohtsuki; Takakatsu Inoue, both of Mooka; Yoshiaki Tanaka, Kitakatsushika, all of Japan

[73] Assignee: Daiichi Denshi Kogyo Kabushiki Kaisha, Japan

[21] Appl. No.: 893,031

[22] Filed: Aug. 4, 1986

[30] Foreign Application Priority Data

Aug. 9, 1985 [JP] Japan .................. 60-175405
Aug. 24, 1985 [JP] Japan .................. 60-128971

[51] Int. Cl.$^5$ ................ G06K 7/01; G06K 13/08
[52] U.S. Cl. .................. 235/487; 235/441; 235/486; 235/482; 235/485; 439/629; 439/59
[58] Field of Search .......... 235/485, 487, 488, 441, 235/440, 486, 492, 480, 483, 482, 379, 380; 439/59, 60, 62, 61, 629, 630, 631, 634, 636, 637

[56] References Cited

U.S. PATENT DOCUMENTS

| | | | |
|---|---|---|---|
| 3,128,498 | 4/1964 | Alles | 235/486 |
| 4,298,237 | 11/1981 | Griffith et al. | 439/60 |
| 4,449,775 | 5/1984 | DePommery et al. | 235/441 |
| 4,602,351 | 7/1986 | Shimamura et al. | 235/441 |
| 4,675,516 | 6/1987 | Guion | 235/492 |
| 4,724,310 | 2/1988 | Shimamura et al. | 235/483 |
| 4,743,746 | 5/1988 | Murschall et al. | 235/441 |

FOREIGN PATENT DOCUMENTS

| | | | |
|---|---|---|---|
| 3235654 | 3/1984 | Fed. Rep. of Germany | 235/441 |
| 3343757 | 6/1985 | Fed. Rep. of Germany | |
| 3412453 | 10/1985 | Fed. Rep. of Germany | 235/379 |
| 8529580 | 2/1986 | Fed. Rep. of Germany | |
| 2492213 | 4/1985 | France | |
| 58-62779 | 4/1983 | Japan | 235/486 |

Primary Examiner—Alan Faber
Assistant Examiner—Robert A. Weinhardt
Attorney, Agent, or Firm—Silverman, Cass, Singer & Winburn, Ltd.

[57] ABSTRACT

When an electronic card is inserted into the device, a first reject plate is pressed to elongate first and second coil springs to anchor the card. When no writing or reading ROM and RAM of the card, electric current instantaneously flows through a solenoid to cause a stopper stopping a second reject plate to rotate through a slight angle so as to disengage the stopper from a front end of the second reject plate. As a result, the second reject plate is depressed by the second coil spring. At the same time, a reject arm provided on the second reject plate moves a reject oblique surface of a card latch to move the card latch through a slight angle to lower a card guide, so that the card is pushed by the first coil spring out of the device. In this manner, the card is not pushed out during writing or reading and hence contents of the card are not damaged. A solenoid requires only a force for moving the stopper through a small distance. The small solenoid and a little power are sufficient to operate the device. As the card is pushed out by the first coil a sufficient pushing device is obtained; so that the device can be used for many years without fatigue of the device.

10 Claims, 10 Drawing Sheets

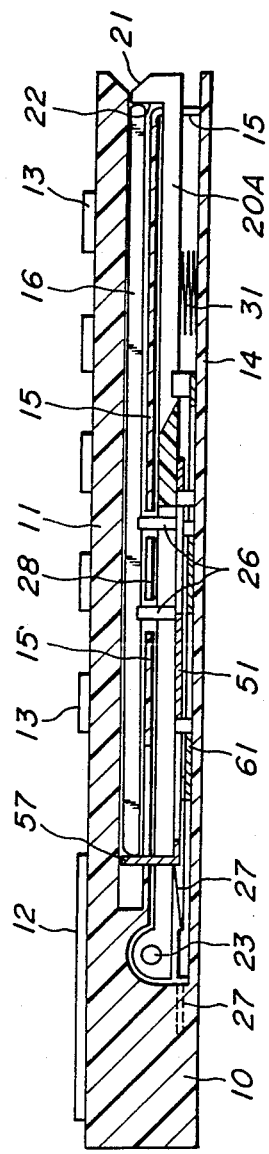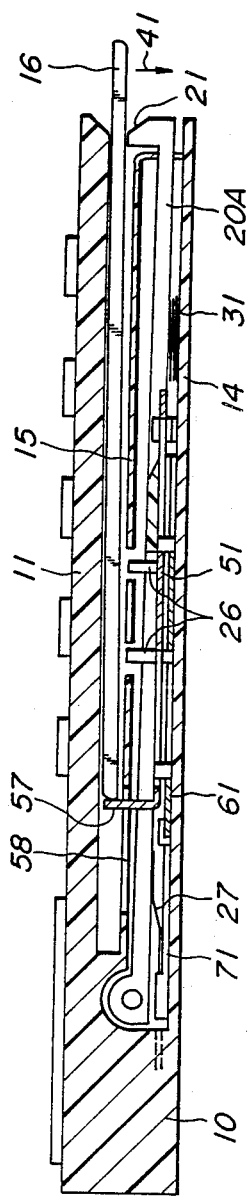

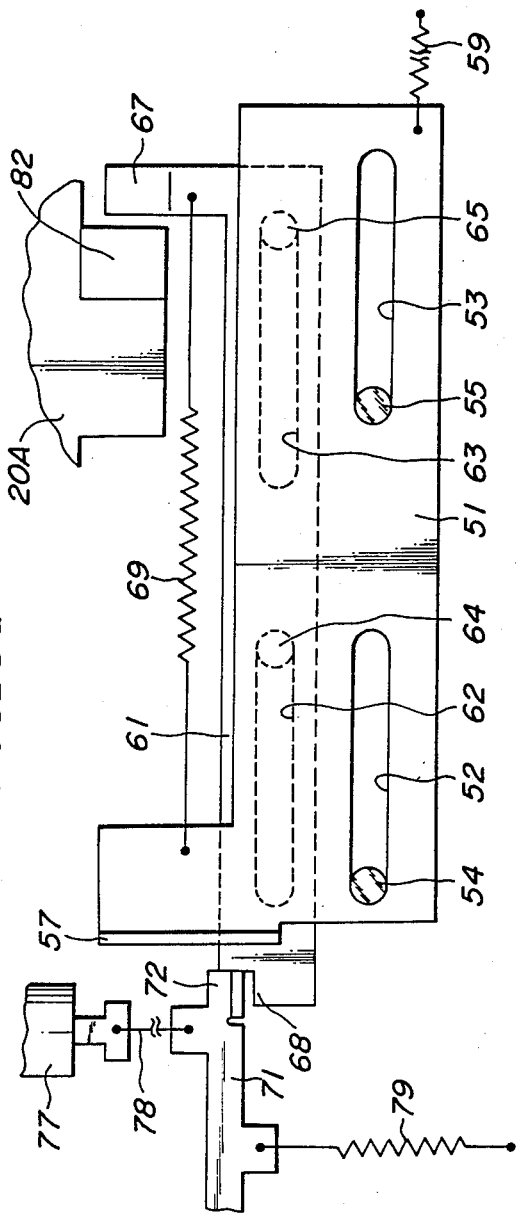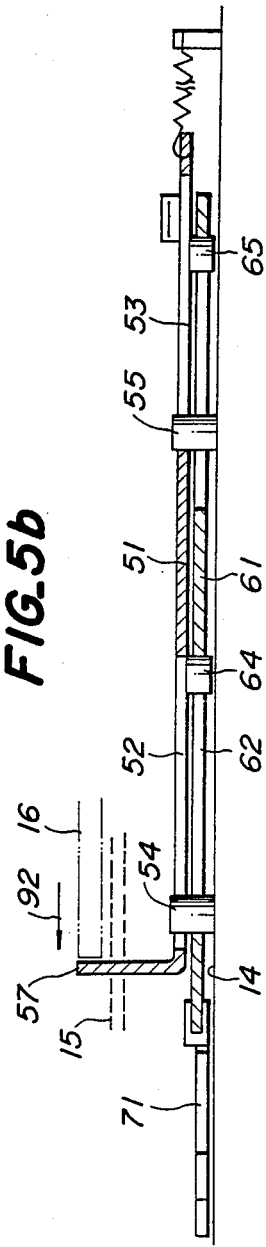
FIG.5a
FIG.5b

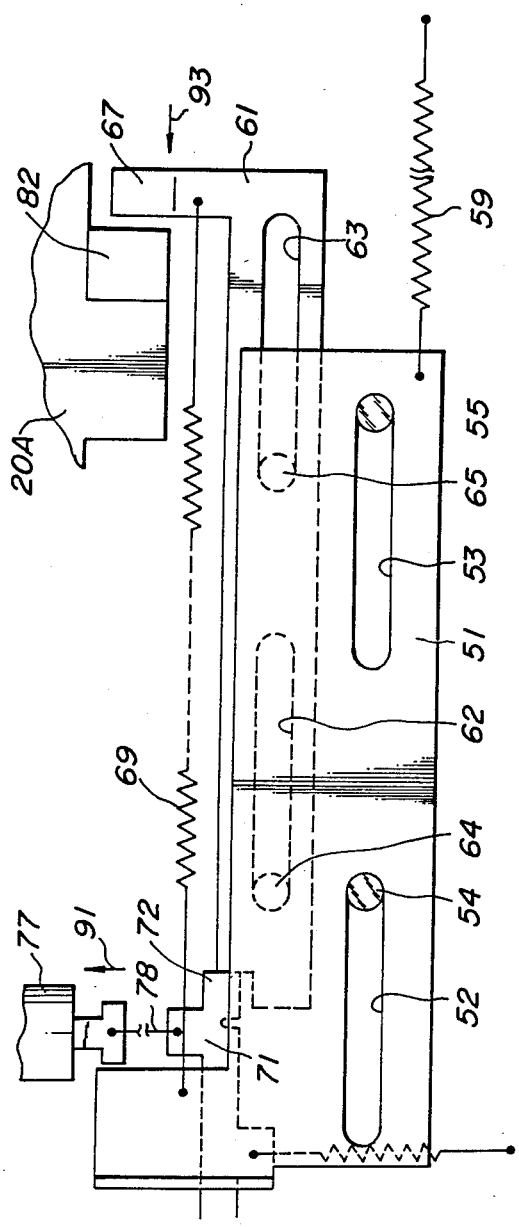
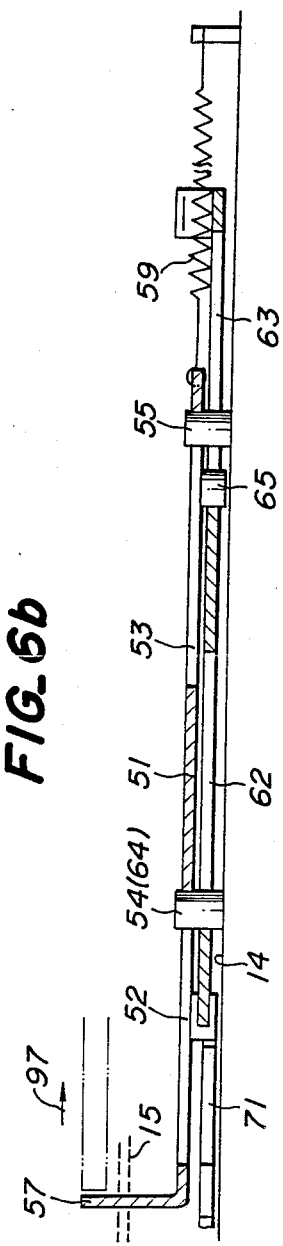
FIG. 6a
FIG. 6b

FIG_7a
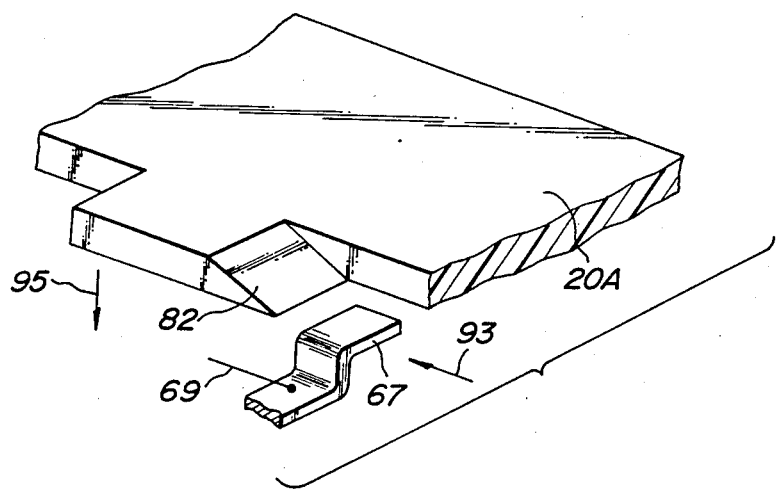
FIG_7b
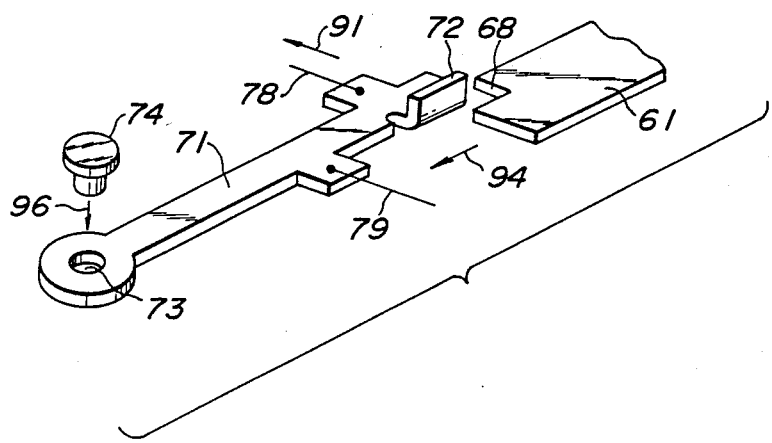

FIG_8a
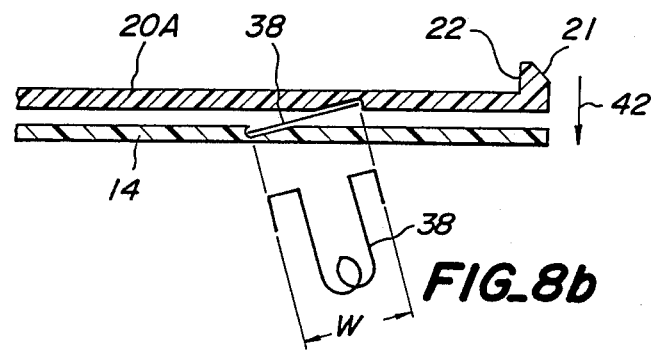
FIG_8b
FIG_9
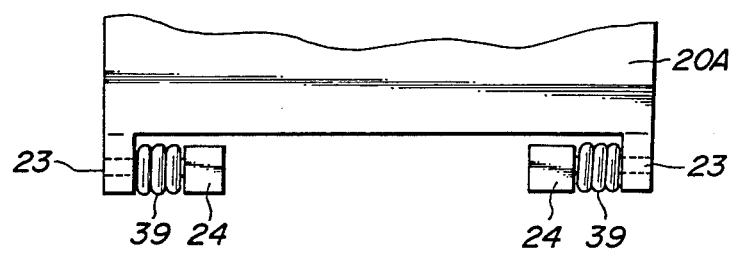

FIG_10a
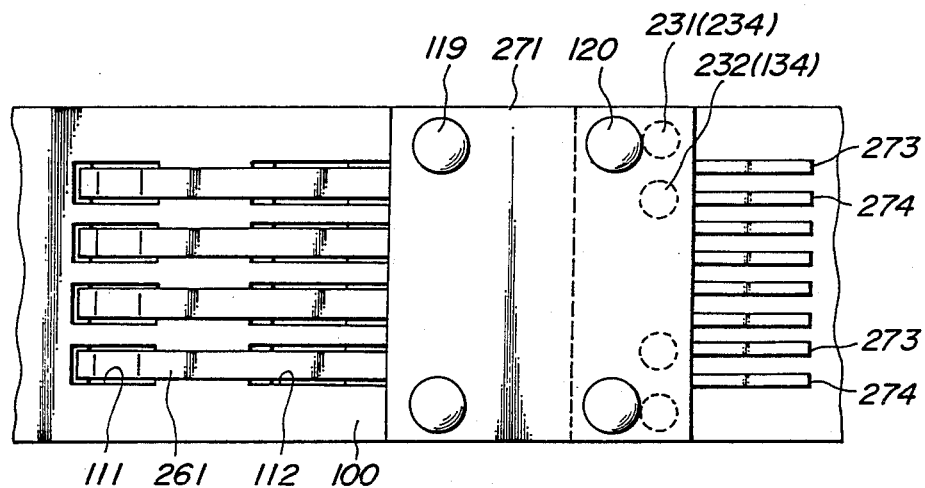
FIG_10b
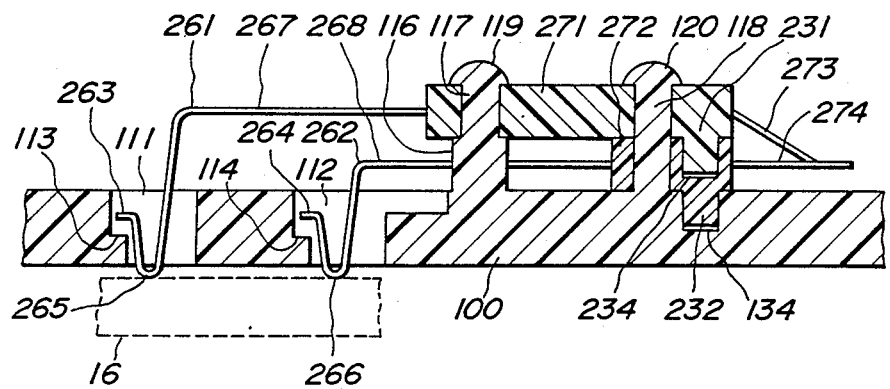

FIG_12
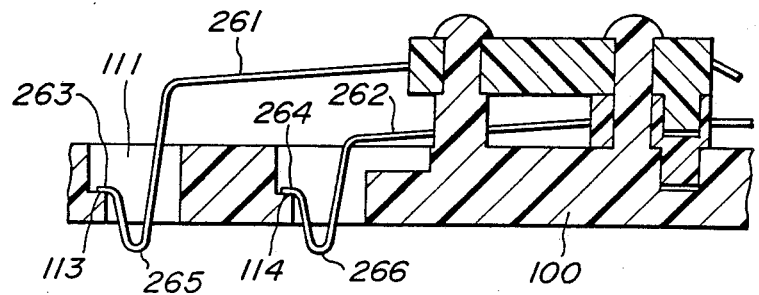
FIG_13a
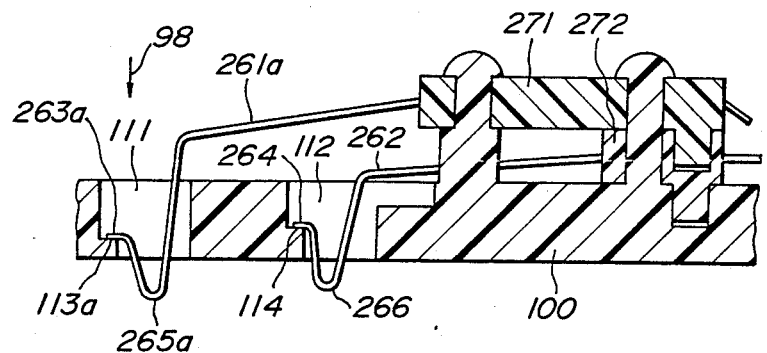
FIG_13b
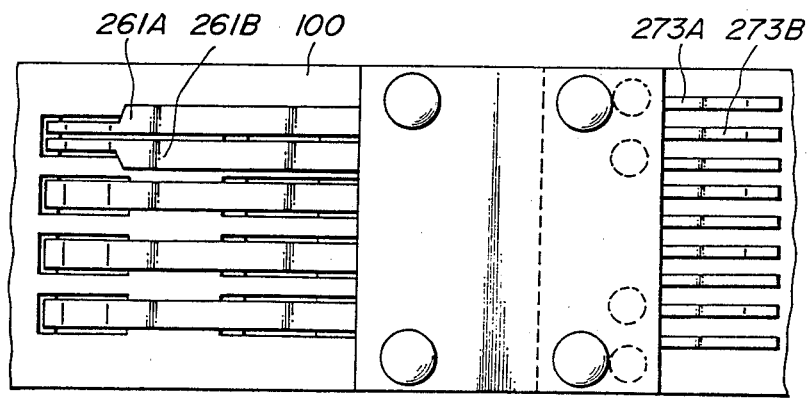

ELECTRONIC CARD RECEIVING DEVICE AND EJECTION MECHANISM

BACKGROUND OF THE INVENTION

This invention relates to an electronic card receiving device for receiving a card in which integrated circuits are incorporated to have electronic functions, which is referred to as an "electronic card" hereinafter, and more particularly to a card inserting and removing mechanism and a card connecting mechanism for the electronic card receiving device.

As the integrated circuit technique has been developed in recent years, it has become to realize integrated circuits on a great scale in a small chip, so that various kinds of electronic cards having high degree functions have been developed so as to be used in wider applications.

FIG. 1 illustrates one of such an electronic card which comprises a non-volatile memory a, i.e. ROM or RAM capable of electrical writing and reading, a central processing unit (CPU) b for controlling operations of the ROM or RAM, a substrate c in the form of a card in which the ROM or RAM and CPU are embedded, contacts d for connection with external electronic instruments. When such an electronic card is used, it is inserted into an electronic card receiving device attached to an external device of an electronic computer or its terminal equipment.

FIGS. 2a-2d schematically illustrate a construction of an electronic card receiving device showing respective conditions, before insertion of a card (FIG. 2a), during insertion (FIG. 2b), just inserted and electrically connected (FIG. 2c), and during removal of the card (FIG. 2d). The device illustrated in FIGS. 2a-2d is submitted as background information of the Assignee of the present invention which is known within the Assignee's organization but was unknown to the public.

The electronic card 16 is inserted into the receiving device in a direction shown by an arrow A as shown in FIG. 2a. The card 16 is advanced into the device, pushing downward a card guide 21 as shown in FIG. 2b. As a result, a card latch 20 moves downward together with the card guide 21, so that contacts 26 in the form of rods of a circuit board 27 attached to the card latch 20 move downward away from a surface of a card holder 15. FIG. 2c illustrates when the electronic card 16 has completely passed by the card guide 21 and has been received in a card receiving chamber. At this moment, the card latch 20 is raised by a spring force of a spring 31, so that the card guide 21 closes an inlet of the card receiving chamber, and the card 16 is fixed in position with respect to the card holder 16 by a reference surface 22 of the card guide 21 cooperating with the urging spring 31. Moreover, as the card latch 20 has been raised, the rod-like contacts 26 of the circuit board 27 attached to the card latch 20 extend beyond the surface of the card holder 15 so as to be connected to contacts of the electronic card to obtain a condition ready for communication.

When it is desired to remove the electronic card from the card receiving device, a reject key 35 extending out of a housing 1 of the device is pushed in a direction shown by an arrow in FIG. 2d. By depressing the reject key 35, the card guide 21 and the card latch 20 start to move downward as shown in the drawing, so that the contacts 26 of the circuit board 27 attached to the card latch 20 move also downward away from the contacts of the card 16 below the surface of the card holder 15. Further, when the card guide 21 is lowered at the level of the surface of the card holder 15, the electronic card 16 is pushed out of the device by a spring force of a leaf spring 33 provided in the card receiving chamber.

The electronic card receiving device above described has such superior functions that when the electronic card is being inserted thereinto or removing therefrom, the contacts of the electronic card do not rub each other and when the electronic card is once accommodated in the device, the card is securely fixed in position relative to the card holder 15 with the aid of the leaf spring 33 and the reference surface 22 of the card guide 21.

However, the device as above described which solves various problems has still further problems as follows.

As such electronic cards have been widely used, there is a tendency for the cards to be roughly handled by users. Moreover, surfaces of terminals of the electronic cards are not necessarily flat and are often distorted due to bending or twisting of the cards. Accordingly, contact terminals of card receiving devices frequently do not completely contact the surfaces of the terminals of the electronic cards. In order to prevent this, it has been proposed to provide a strong spring as a spring corresponding to the spring 31 shown in FIG. 2a. However, such a strong spring tends to damage the contact terminals of the devices and the surfaces of terminals of the electronic cards, so that a high reliability of the devices based on such as million times of insertions and removals of the cards cannot be obtained. In case of a great number of terminals with narrow intervals, particularly, it is difficult to manufacture high reliable contacts in flat and small forms.

In the card receiving device as above described, when an electronic card is removed from the device, the card latch 20 is pushed down by manually pressing the reject key 35 to move the electronic card 16 out of the device with the aid of the leaf spring 33.

With this arrangement, the electronic card 16 is pushed out of the device as soon as the reject key 35 is pressed. On the other hand, the reject key 35 is often pressed, for example, during writing or reading of the ROM and RAM in the electronic card or the reject key 35 is frequently unintentionally pressed, so that such a mishandling causes the ROM and RAM to be damaged or at least the contents of the ROM and RAM to be abnormal.

Moreover, the electronic card is pushed out of the device by means of the leaf spring 33. However, it is difficult to provide a long stroke distance of the leaf spring 33. If a distance by which the electronic card is moved out of the device is made sufficient, the leaf spring is subjected to an overload which would prematurely fatigue the leaf spring.

SUMMARY OF THE INVENTION

It is a principal object of the invention to provide an improved electronic card receiving device which eliminates all the disadvantages above described and which is reliable, easy to use and durable without being inadvertently operated during writing and reading the ROM and RAM of an electronic card and hence without damaging contents of the ROM and RAM.

In order to achieve this object in an electronic card receiving device including a card holder forming a card receiving space in the device for receiving an electronic card, a card anchoring mechanism for holding the electronic card in position in the card receiving space formed by the card holder, a contacting mechanism for electrically connecting the device to contacts of the electronic card held in position, and a card pushing mechanism for disconnecting the device from the electronic card and pushing it out of the device, according to the invention, said contacting mechanism comprises at least one contact terminal and a substrate, said contact terminal comprising a straight extending contact arm and a J-shaped contact element having a stopper portion at its distal end, and said substrate comprising a contact substrate for fixing said contact terminal so that said straight extending contact arm is substantially in parallel with a surface of the electronic card and a terminal aperture for accommodating said J-shaped contact element and having a step for supporting said stopper portion of said J-shaped contact element.

In a preferred embodiment of the invention the card anchoring mechanism comprises a reference surface of a guide portion provided at a front end of a latch plate and a first eject plate being pulled by a first coil spring for urging the electronic card against the reference surface to hold the electronic card in position, the latch plate being urged toward the inserted card by a spring, thereby closing an inlet for the card by the guide portion and forming by an inside of the guide portion a reference surface for the held electronic card.

In order that the invention may be more clearly understood, preferred embodiments will be described, by way of example, with reference to the accompanying drawings.

BRIEF DESCRIPTION OF THE DRAWINGS

FIGS. 3a 3b are sectional views of the electronic card receiving device according to the invention;

FIG. 4 is a plan view of the device shown in FIG. 3a;

FIGS. 5a, 5b, 6a and 6b are enlarged views of principal part of the device shown in FIG. 4;

FIGS. 7a and 7b are exploded perspective views illustrating parts of the device shown in FIG. 4;

FIG. 8a is a sectional view of parts of the device shown in FIG. 4;

FIG. 8b is a view illustrating U-shaped spring used in a modification of the device shown in FIG. 4;

FIG. 9 is a partial view illustrating parts used in another modification of the device shown in FIG. 4;

FIGS. 10a and 10b are plan and sectional views illustrating one embodiment of the contacting mechanism according to the invention;

FIG. 12 is a partial sectional view of the embodiment after removal of the card; and FIGS. 13a and 13b are partial sectional and plan views illustrating a further embodiment of the invention.

DESCRIPTION OF THE PREFERRED EMBODIMENTS

Figure 1:
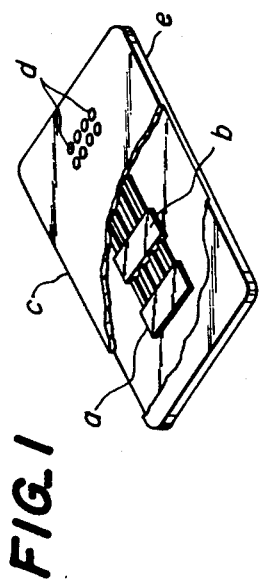
FIG. 1 is a perspective view illustrating of an electronic card.
Figure 2C:
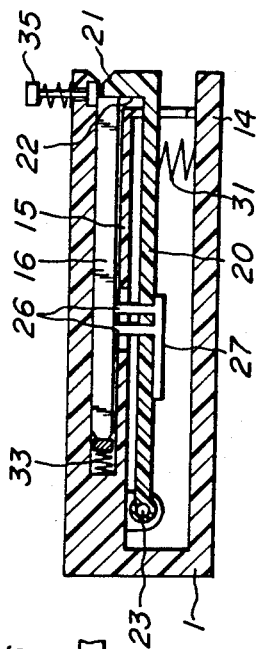
FIGS. 2a, 2b, 2c and 2d are sectional views illustrating a card receiving device constructed in accordance with the background information.
Figure 2D:
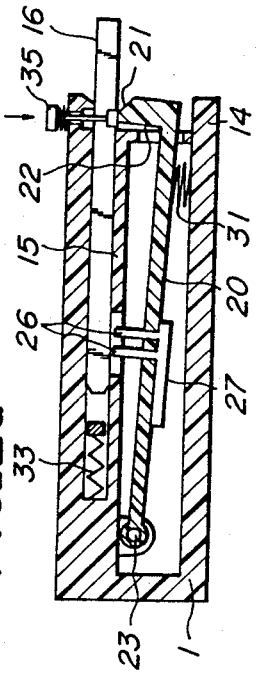
Figure 2A:
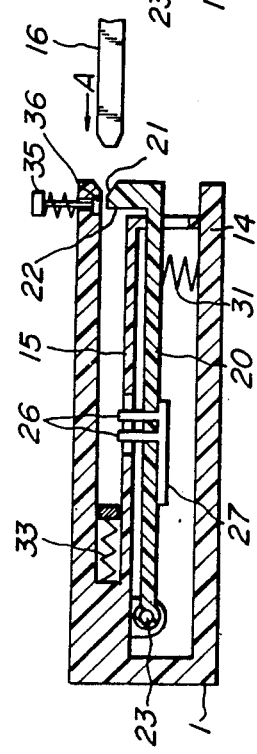
Figure 2B:
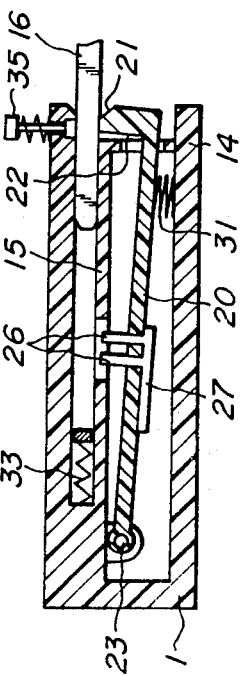

FIGS. 3a and 3b are sectional views of an electronic equipment provided with an electronic card receiving device according to the invention. The drawings illustrate a housing 10 of the electronic equipment, an operating panel 11, a display 12 such as a liquid crystal display, a key 13 for inputting and operating data, a bottom plate 14, a cardholder 15 for holding an electronic card 16, a card latch 20A for anchoring the inserted card 16 in position, a card guide 21 which is a part of and extends from the card latch 20A, a reference surface 22 formed in an inside of the card guide 21 as a positional reference when the electronic card 16 is anchored, a card latch shaft 23 for pivotal movement of the card latch 20A to cause the card guide 21 to move upward and downward, and a plurality of contact terminals 26 attached to a part of the card latch 20A so as to be brought into contact with terminals of the electronic card. The drawings further illustrate a flexible PCB 27 (flexible printed circuit board) for signal lines from the contact terminals 26, terminal apertures 28 formed in the card holder 15 for passing the terminals 26 therethrough, a spring, for example, helical spring 31 for normally urging the card latch 20A upwardly, and a first reject plate 51 having at its inner end an abutting portion 57 formed by bending the inner end into an L-shape which is pushed inwardly by pushing by a front end of the card 16 and simultaneously serves to push the card out of the device. The card holder 15 is formed with an abutting portion aperture 58 for enabling the abutting portion 57 to pass therethrough. A second reject plate 61 is provided in parallel with the first reject plate 51. A stopper 71 serves to prevent the second reject plate 61 from being inserted together with the first reject plate 51.

FIG. 3a illustrates the apparatus in which the inserted electronic card 16 has been anchored. FIG. 3b illustrates the apparatus in which the electronic card 16 is shown in a halfway position in inserting or removing.

Figure 4:
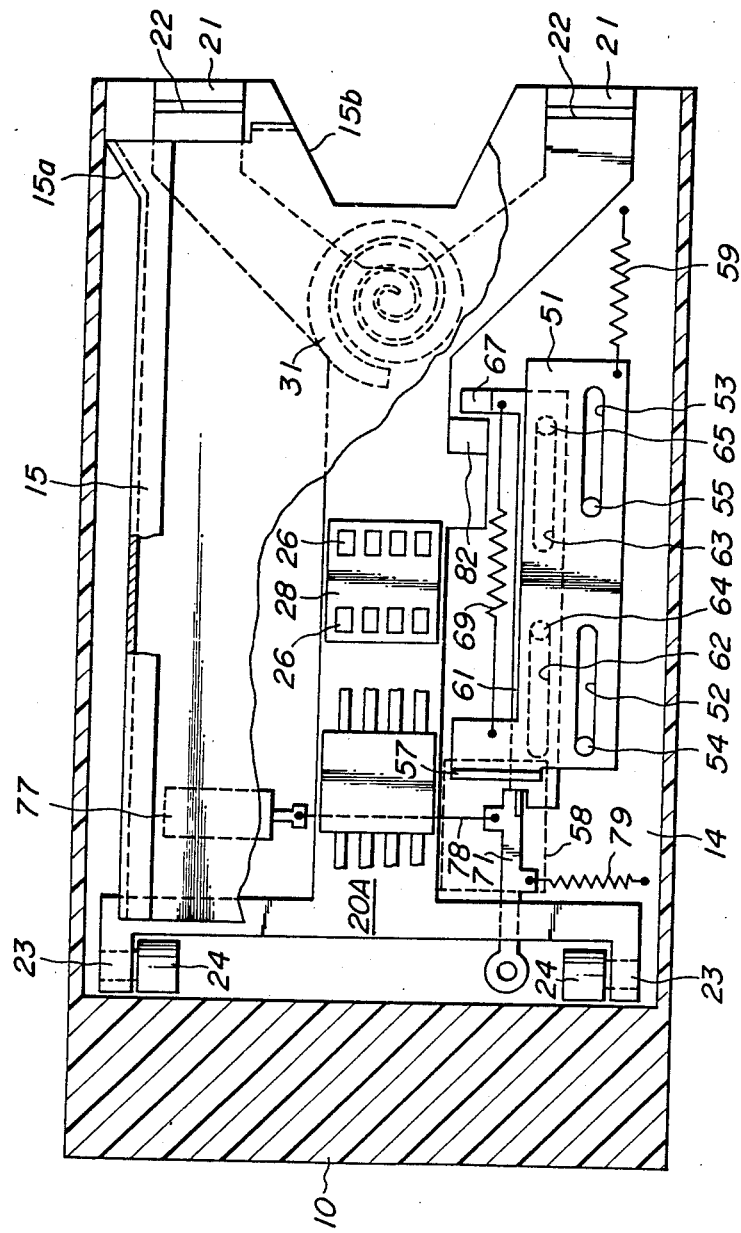

FIG. 4 is a plan view of the device shown in FIGS. 3a and 3b after removal of the panel 11 and corresponds to FIGS. 3a and 3b. Elongated guide apertures 52 and 53 serve to guide the first reject plate 51 to be inserted through a predetermined distance by insertion of the card 16. Fixed guide pins 54 and 55 are fixed to the bottom plate 14 so as to permit the first reject plate 51 to slidingly move in predetermined directions. A coil spring 59 is elongated when the electronic card 16 is inserted, and pushes the card 16 out of the device by its contractive force when the card 16 is removed. Guide apertures 62 and 63 are formed in the second reject plate 61 on the opposite side of the first reject plate and in parallel with the guide apertures 52 and 53. Movable guide pins 64 and 65 are provided on the first reject plate and located in the guide apertures 62 and 63. The second reject plate 61 is integrally formed with a reject arm 67 for moving the card latch 20A through slight angles to remove the electronic card 16. A coil spring 69 is connected between the first and second reject plates 51 and 61. A solenoid valve 77 serves to move the stopper 71 through a wire 78 to permit the second reject plate 61 to slide. A coil spring 79 sets the stopper 71 at a location at which the stopper 71 stops the second reject plate 61 which the solenoid valve 77 is inoperative.

A Y-shaped card latch 20A is formed with a reject oblique surface 82 adapted to be lowered by an action of the moving reject arm 67.

FIGS. 5a and 5b and FIGS. 6a and 6b are explanatory views for operations of the first and second reject plates 51 and 61 and the stoppers 71 in conditions shown in FIGS. 3b and 3a.

FIG. 7a is an enlarged perspective view of the reject arm 67 and the reject oblique surface 82 provided on the card latch 20A. FIG. 7b is an enlarged perspective view illustrating the relation between a second reject end 68 of the second reject plate 61 and the stopper 71 pivotally connected to the bottom plate 14 by a stopper shaft 74 inserted into a shaft aperture 73 of the stopper 71 in a direction of an arrow 96.

When the electronic card 16 is inserted into the device, first a front end of the card abuts against the card guide 21 to lower the card latch 20A, so that the card moves slidingly above the card holder 15 until the front end of the card abuts against the abutting portion 57 without rubbing the contact terminals 26 (FIG. 3b and FIG. 5a).

The electronic card 16 is further pushed in a direction shown by an arrow 92 in FIG. 5b to move the abutting portion 57 in the same direction. As a result, the coil spring 59 is elongated and the second reject plate is also pulled by the coil spring 69. However, the second reject plate is prevented from moving by the action of the stopper 71, so that the coil spring 69 is elongated.

Thereafter, when a rear end of the electronic card 16 moves beyond the card guide 21 and falls on an inner side thereof, the card latch 20A is raised by the action of the spring 31 to bring the contact terminals 26 into contact with the electronic card 16 which is anchored thereat (FIG. 5b).

In this anchored condition, the electronic card 16 is urged by the abutting portion 57 by the action of the coil spring 59 in a direction shown by an arrow 97 (FIG. 6b), so that the rear end of the electronic card 16 is pressed against the reference surface 22 so as to assume a desired position exactly with high accuracy.

In the condition shown in FIG. 8a and FIGS. 6a and 6b, electric current is instantaneously caused to flow in the solenoid 77, so that the solenoid 77 is actuated to pull the wire 74 in a direction shown by an arrow 91 (FIGS. 6a and 7b) to cause the stopper 71 to rotate slightly about the stopper shaft 74 (FIG. 7b) against the force of the coil spring 79 so as to disengage from the front end 68 of the second reject plate.

At this moment, the second reject plate 61 subjected to the tensile force of the coil spring 69 is rapidly moved in a direction shown by an arrow 93 (FIGS. 6a and 7a). As a result, the reject arm 67 is moved in the direction of the arrow 93 to press the reject oblique surface 82 downward in a direction shown by an arrow 95 (FIG. 7a), so that the card latch 20A is rotated by a slight angle to position the card guide 21 below the surface of the card holder 15, with the result that the coil spring 59 urges the electronic card 16 outwardly with the aid of the abutting portion 57 into the condition shown in FIG. 3b. In this case, the distance by which the electronic card extends from the device can be set by lengths of the guide apertures 52, 53, 62 and 63.

In the above explanation, the second reject plate 61 is located between the first reject plate 51 and the bottom plate. The first reject plate may be located between the second reject plate and the bottom plate. Moreover, the contact terminals have been explained to bring them into contact with the underside of the card. The construction of the device may be turned upside down to bring the contact terminals into contact with the upper surface of the card.

In the above embodiment, the card latch 20A is raised by the spiral spring 31. However, it may be constructed as shown in FIGS. 8a and 8b and FIG. 9.

As shown in FIGs. 8a and 8b, a U-shaped spring 38 having a width W is provided between the bottom plate 14 and the card latch 20A. The U-shaped spring 38 tends to expand to a width wider than W, so that the card latch 20A is urged upward as viewed in FIG. 8a. When the card latch 20A is pressed downward in a direction shown by an arrow 42, the width of the U-shaped spring 38 becomes smaller than W. Accordingly, the force for pressing the card latch 20A downward disappear, the card latch 20A is raised by the U-shaped spring 38.

In FIG. 9, coil springs 39 are coiled about shafts between bearings 24 and card ratch shafts 23, thereby normally urging the card latch 20A upward.

Moreover, electronic circuits are incorporated in the housing 10 in FIGS. 3a and 3b and FIG. 4. However, such electronic circuits are not shown because they are not essential for understanding the invention.

A contacting mechanism for the electronic card receiving device according to the invention will be explained by referring to FIGS. 10a, 10b, 11, 12 and 13a and 13b.

Figure 11:
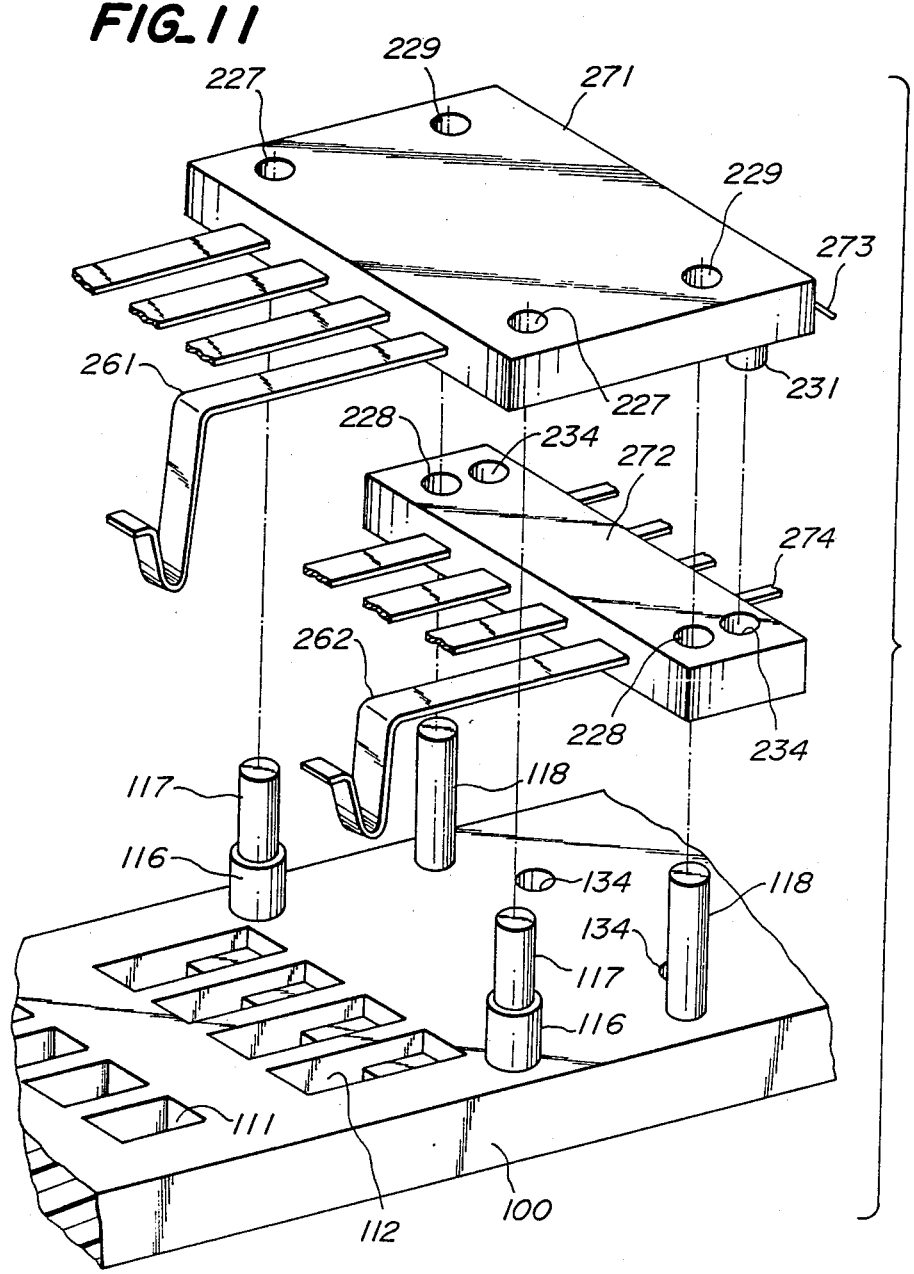
FIG. 11 is an exploded perspective view of the embodiment shown in FIGS. 10a and 10b.

FIGS. 10a and 10b are a plan view and an explanatory sectional view illustrating one embodiment of the invention, which comprises a contact structure for an electronic card having terminals in two rows. FIG. 11 is an exploded perspective view. Reference numeral 16 denotes an electronic card. A substrate 100 is formd with a plurality of terminal apertures 111 and 112 and stud apertures 134 and comprises studs 117 and 118. Contact terminal substrates 271 and 272 have a plurality of contact termianls 261 and 262 made of a springy material, respectively, which are arranged side by side in planes. The contact terminals 261 and 262 consist of contact terminal arms 267 and 268 extending in parallel with the electronic card 16, J-shaped contact elements 265 and 266 located at front ends of the contact terminal arms, and stopper portions 263 and 264 at distal ends of the J-shaped contact elements. The lowermost portions of the J-shaped contact elements 265 and 266 are contact portions for the electronic card. The J-shaped contact elements 265 and 266 are able to move in the terminal apertures 111 and 112 of the substrate 100 in directions perpendicular to the surface of the electronic card. The movement of the J-shaped contact elements 265 and 266 toward the electronic card is limited by the stopper portions 263 and 264 abutting against steps 113 and 114 provided in the terminal apertures 111 and 112.

Contact terminal lead lines 273 and 274 extend from the substrates 271 and 272 on sides opposite to the respective contact terminals 261 and 262 for connecting these terminals 261 and 262 to flexible PCB (not shown). Studs 231 and 232 serve to position the substrates 271 and 272 and are press-fitted in stud apertures 234 and 134 of the substrates 272 and 100. Studs 118 vertically extend from the substrate 100 and through the substrates 271 and 272. Studs 117 having bases of which thickness is equal to that of the substrate 272 extend through the substrate 271. Upper portions of the studs 117 and 118 are collapsed or calked to form stud heads 119 and 120, thereby fixing the substrates 271 and 272 to the substrate 100.

FIG. 12 illustrates the J-shaped contact elements 265 and 266 whose contact portions are not in contact with the card, while the stopper portions 263 and 264 abut against the steps 113 and 114.

FIG. 13a illustrates another embodiment of the invention. In this case, among many contact terminals 261 and 262, a step 113a supporting a stopper portion 263a of a contact terminal 261a to be used for earth is nearer to the card than the step 114, so that the contact portion 265a extends longer than that of the J-shaped contact elements 266. When the substrate 100 moves in a direction shown by an arrow 98, the contact portion 265a first contacts the card to effect earthing, so that memorized contents of the electronic card is not damaged.

In order to ensure earthing, two contact terminals 261A and 261B shown in FIG. 13b may be used to earth contact terminal lead wires 273A and 273B. In this manner, the two contact terminals 261A and 261B ensure the earthing for dirt and scratches on the electronic card. With the contact terminals 261A and 261B shown in FIG. 13b, contact portions may extend larger than those of other contact terminals as the contact portion 265a shown in FIG. 13a. The card latch 20A shown in FIGS. 3a and 3b and the like may be used for the substrate 100. In this manner, this invention provides the card receiving device which is reliable and easy to use.

The device according to the invention completely prevents an electronic card from being inadvertently rejected during writing and reading ROM and RAM of the card, to prevent damage of contents of ROM and RAM, thereby providing reliable device. Moreover, it is possible to provide a large extending distance of a rejected card to facilitate the operation of the card. Moreover, the device according to the invention prevents fatigue of the reject mechanism and damage of the card by contact terminals which would otherwise rub the card, so that any malfunction due to incomplete contact is prevented.

Moreover, the respective contact terminals of the contacting mechanism is flexible independently from each other, so that even if terminal surfaces of an electronic card is distorted such as bending, sufficiently good contact between the terminals and a card. According to the invention, contact terminal substrates are piled to provide for rows of terminals, so that a high reliable and little fatigue contact construction for electronic cards can be obtained.

Moreover, if the invention is used in combination with the technique described in the background information, the invention exhibits the effect preventing the damage of a card due to rubbing when inserting and thus preventing insufficient contact between terminals. This invention is very useful and applicable.

It is further understood by those skilled in the art that the foregoing description is that of preferred embodiments of the disclosed devices and that various changes and modifications may be made in the invention without departing from the spirit and scope thereof.

What is claimed is:

1. An electronic card receiving device for accepting an electronic card having a plurality of contacts thereon and ejecting the card upon a given signal comprising:
    card holder means forming a card receiving space in the device for receiving an electronic card;
    card anchoring means for anchoring and holding said electronic card in position in said card receiving space;
    movable contact means for electrically connecting the device to said contacts of said electronic card;
    means for moving said movable contact means into engagement with said contacts of said electronic card;
    card pushing means for disconnecting the device from the electronic card and ejected it out of the device, said card pushing means including means for activating said card pushing means, said means for activating including a solenoid in operable communication with a wire secured to a stopper, said stopper being biased by a coil spring in a direction opposite to the direction said solenoid moves said wire, means for retracting said movable contact means from engagement with said contacts of said electronic card, said means for retracting including a first spring in operable communication with a first reject plate, having an abutting portion thereof, to spring bias said first reject plate in a desired direction, said first reject plate being held against the force of said first spring by said stopper, a latch plate having a guide portion including a reference surface at a front end thereof and an oblique surface for contact with said abutting portion, means for ejecting said card from said device, said means for ejecting including a second spring in operable communication with a second reject plate, having a reject arm for contact with said electronic card, to move said second reject plate in a desired direction so that upon activation of said solenoid said stopper is moved by said wire against the force of said coil spring to release said first reject plate, said first spring moves said abutting surface to contact said oblique surface to move said latch plate thereby releasing said second reject plate to allow said second spring to move said reject plate and eject said electronic card out of said device with said reject arm.

2. A device as set forth in claim 1, wherein said contact means includes at least one contact terminal and a substrate, said contact terminal including a straight extending contact arm and a J-shaped contact element having a stopper portion at its distal end, said substrate including a contact substrate for fixing said contact terminal so that said straight extending contact arm is substantially in parallel with a surface of the electronic card and a terminal aperture for accommodating said J-shaped contact element and having a step for supporting said stopper portion of said J-shaped contact element.

3. A device as set forth in claim 2, wherein said contact means is attached to a latch plate.

4. A device as set forth in claim 3, wherein said latch plate is utilized as the substrate of said contact means.

5. A device as set forth in claim 1, wherein said card anchoring means includes said second movable reject plate biased by said second spring means for contacting and resisting insertion of said card and for urging and holding said electronic card against said reference surface, and means for moving said latch plate toward the inserted card substantially perpendicular to the insertion direction of said card after said card is in position against said reference surface to thereby close an inlet for said card with said guide portion.

6. An electronic card receiving device including a card holder forming a card receiving space in the device for receiving an electronic card, a card anchoring mechanism for holding the electronic card in position in the card receiving space formed by the card holder, a movable contacting mechanism for electrically connecting the device to contacts of the electronic card held in position, and a card pushing mechanism for disconnecting the device from the electronic card and pushing it out of the device, wherein said contacting mechanism comprises at least one contact terminal and a substrate, said contact terminal including a straight extending contact arm and a J-shaped contact element having a stopper portion at its distal end, and said substrate including a contact substrate for fixing said contact terminal so that said straight extending contact arm is substantially in parallel with a surface of the electronic card and a terminal aperture for accommodating said J-shaped contact element and having a step for supporting said stopper portion of said J-shaped contact element and means for moving said contact substrate to electrically connect said J-shaped contact element to contacts of said electronic card, said card pushing mechanism including an anchoring relief command means, a contact relief command means, anchoring relief means and pushing means, said anchoring relief command means including a solenoid in operable communication with a wire, secured to a stopper held by a coil spring, said contact relief command means including a second coil spring in operable communication with a second reject plate having a reject arm for contact with a reject oblique surface of a latch plate, said anchoring relief means including said latch plate provided at its front end with a card guide portion having a reference surface, and said pushing means including a first coil spring in operable communication with a first reject plate having an abutting portion.

7. A device as set forth in claim 6, wherein said contacting mechanism is attached to a latch plate.

8. A device as set forth in claim 7, wherein said latch plate is utilized as the substrate of said contacting mechanism.

9. A device as set forth in claim 6, wherein said card anchoring mechanism includes said first reject plate being pulled by said first coil spring for urging the electronic card against said reference surface to hold the electronic card in position, and means for moving said latch plate toward the inserted card after said electronic card is in position, thereby closing an inlet for the card by the guide portion and forming by an inside of the guide portion a reference surface for the held electronic card.

10. An electronic card receiving device including a card holder forming a card receiving space in the device for receiving an electronic card, a card anchoring mechanism for holding the electronic card in position in the card receiving space formed by the card holder, a movable contacting mechanism for electrically connecting the device to contacts of the electronic card held in position, and a card pushing mechanism for disconnecting the device from the electronic card and pushing it out of the device, wherein said card pushing mechanism comprises an anchoring relief command means, a contact relief command means, anchoring relief means and pushing means, said anchoring relief command means including a solenoid in operable communication with a wire secured to a stopper held by a coil spring, said contact relief command means including a second coil spring in operable communication with a second reject plate having a reject arm for contact with a reject oblique surface of a latch plate, said anchoring relief means including said latch plate provided at its front end with a card guide portion having a reference surface, and said pushing means including a first coil spring in operable communication with a first reject plate having an abutting portion.

* * * * *

UNITED STATES PATENT AND TRADEMARK OFFICE
CERTIFICATE OF CORRECTION

PATENT NO. : 4,931,622

DATED : June 5, 1990

INVENTOR(S) : Tomonari Ohtsuki and Yoshiaki Tanaka

It is certified that error appears in the above-identified patent and that said Letters Patent is hereby corrected as shown below:

Column 8, line 17, change "thereof" to --thereon--.

Signed and Sealed this

Tenth Day of March, 1992

*Attest:*

HARRY F. MANBECK, JR.

*Attesting Officer*      *Commissioner of Patents and Trademarks*